United States Patent [19]

Yamazaki et al.

[11] Patent Number: 5,516,868
[45] Date of Patent: May 14, 1996

[54] VINYL COPOLYMER, METHOD FOR MAKING, AND ROOM TEMPERATURE CURING RESIN COMPOSITION

[75] Inventors: Toshio Yamazaki; Shinichi Morioka; Nobuyuki Syzuki; Shoji Ichinobe, all of Gunma, Japan

[73] Assignee: Shin-Etsu Chemical Co., Ltd., Tokyo, Japan

[21] Appl. No.: 497,052

[22] Filed: Jun. 30, 1995

Related U.S. Application Data

[62] Division of Ser. No. 335,407, Nov. 3, 1994, abandoned.

[30] Foreign Application Priority Data

Nov. 5, 1993 [JP] Japan ................... 5-301221
Mar. 24, 1994 [JP] Japan ................... 6-053670

[51] Int. Cl.$^6$ ................... C08G 77/08
[52] U.S. Cl. ................... 528/12; 528/14; 528/17; 528/18; 528/21; 528/22; 528/34; 526/279; 525/100
[58] Field of Search ................... 528/17, 18, 21, 528/22, 14, 12, 34; 526/279

[56] References Cited

U.S. PATENT DOCUMENTS

| | | | |
|---|---|---|---|
| 4,419,505 | 12/1983 | Ratkowski et al. | 526/279 |
| 4,661m573 | 4/1987 | Ratkowski et al. | 526/279 |
| 5,115,014 | 5/1992 | Wakabayashi et al. | 524/506 |
| 5,342,983 | 8/1994 | Yamazaki et al. | 556/445 |

FOREIGN PATENT DOCUMENTS 0184924 6/1986 European Pat. Off.
0242080 10/1987 European Pat. Off.

OTHER PUBLICATIONS

Introduction to Polymer Chemistry, Stille 1962, pp. 66–67.
Textbook of Polymer Science, Billmeyer, Jr., 1962, pp. 358–361.

Primary Examiner—John C. Bleutge
Assistant Examiner—Margaret W. Glass
Attorney, Agent, or Firm—Birch, Stewart, Kolasch & Birch

[57] ABSTRACT

A vinyl copolymer is provided comprising a silanol group-containing (meth)acryl siloxane unit of formula (1):

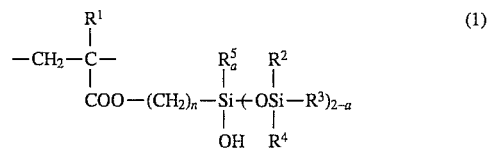

wherein $R^1$ is hydrogen or methyl, $R^2$, $R^3$, and $R^4$ are independently a monovalent $C_1$–$C_8$ hydrocarbon group or a siloxy group, $R^5$ is a monovalent $C_1$–$C_8$ hydrocarbon group, $n=1$ to 12, and $a=0$ or 1. The vinyl copolymer is prepared by copolymerizing a polymerizable vinyl monomer with a silanol group-containing (meth)acryl siloxane in the presence of a radical initiator or by emulsion polymerizing a polymerizable vinyl monomer with a silanol group-containing (meth)acryl siloxane in an aqueous medium in the presence of a surfactant and a polymerization initiator. The copolymer is blended with a condensation catalyst to form a room temperature curable resin composition which crosslinks in the presence of moisture into a cured coating having weatherability, flexibility, and adherence.

18 Claims, No Drawings

VINYL COPOLYMER, METHOD FOR MAKING, AND ROOM TEMPERATURE CURING RESIN COMPOSITION

This application is a divisional of application Ser. No. 08/335,407, filed on Nov. 3, 1994, now abandoned.

BACKGROUND OF THE INVENTION

1. Field of the Invention

This invention relates to a vinyl copolymer having a silanol group in a side chain, more particularly, to a silanol group-containing vinyl copolymer which offers a room temperature curable resin composition of one pack type which crosslinks in the presence of moisture into a cured coating having weatherability, flexibility, and adherence and is thus suitable as a coating agent. It also relates to a method for preparing the copolymer and a room temperature curable resin composition containing the copolymer.

2. Prior Art

In the prior art, acrylic urethane resins, acrylic silicone resins, and fluorinated resins are known as useful resins for paint, especially useful resins for use in room temperature curable coating compositions having weatherability. Among these resins, acrylic urethane resins are less expensive, but use as the source reactant isocyanates which are harmful to the human body. Fluorinated resins have weatherability, but are expensive. In contrast, acrylic silicone resins are recently under increasing demand because of a good compromise between performance and cost.

The acrylic silicone resins have an alkoxysilyl group attached to an acrylic backbone. The acrylic silicone resins can form stable cured coatings when applied to supports because alkoxysilyl groups react with moisture in air at room temperature to produce siloxane bonds. See Coating and Paint, No. 429, pages 55–64. An alkoxysilyl group can be introduced into an acrylic backbone, for example, by copolymerizing a polymerizable vinyl group-containing silane compound in the presence of a radical initiator as disclosed in Japanese Patent Application Kokai (JP-A) No. 36109/1982.

However, the conventional acrylic silicone resins fail to impart weatherability as high as fluorinated resins and enough flexibility to meet a wide variety of applications. There is a need for an acrylic silicone resin having these properties.

Most methods of preparing acrylic silicone resins are of solution type using organic solvents and most of acrylic silicone resin compositions are also of solution type, both failing to meet the current trend toward non-pollution and resource saving. Known methods for carrying out copolymerization in aqueous media without using organic solvents include emulsion polymerization and suspension polymerization. With these methods, however, hydrolyzable groups to be retained, such as alkoxysilyl groups, react with water to crosslink during copolymerization or storage, inducing inconvenient thickening and gelation.

SUMMARY OF THE INVENTION

An object of the present invention is to provide a novel and improved vinyl copolymer suitable as a major component of a room temperature curable resin composition capable of forming a cured coating having as high weatherability as fluorinated resins and improved flexibility. Another object of the invention is to provide a method for preparing the vinyl copolymer. A further object of the present invention is to provide a room temperature curable resin composition which cures into a coating having as high weatherability as fluorinated resins and improved flexibility.

We have found that a novel vinyl copolymer comprising a silanol group-containing (meth)acryl siloxane unit of the general formula (1) and thus having a silanol group in a side chain can be obtained by copolymerizing a polymerizable vinyl monomer with a silanol group-containing (meth)acryl siloxane of the general formula (2) in the presence of a radical initiator. This silanol-containing vinyl copolymer is formulated with a condensation catalyst into a one pack type composition which is storage stable and cures into a coating having weatherability, flexibility, and adherence. Preferably the composition is a room temperature curable resin composition useful for coating purposes.

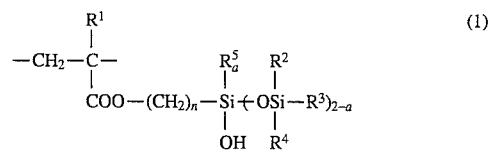

(1)

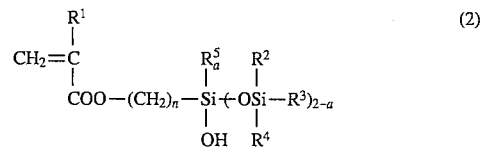

(2)

In formulae (1) and (2), $R^1$ is a hydrogen atom or methyl group, $R^2$, $R^3$, and $R^4$ are independently selected from the group consisting of a substituted or unsubstituted monovalent hydrocarbon group having 1 to 8 carbon atoms and a siloxy group of the formula: —$OSiR^6R^7R^8$ wherein $R^6$, $R^7$, and $R^8$ are independently selected from organic groups having 1 to 8 carbon atoms, $R^5$ is a substituted or unsubstituted monovalent hydrocarbon group having 1 to 8 carbon atoms, letter n is an integer of 1 to 12, and a is equal to 0 or 1.

We have further found that a novel vinyl copolymer comprising a silanol group-containing (meth)acryl siloxane unit of formula (1) can also be obtained by emulsion polymerizing a polymerizable vinyl monomer with a silanol group-containing (meth)acryl siloxane of formula (2) in an aqueous medium in the presence of a surfactant and a polymerization initiator.

As compared with conventional acrylic silicone copolymers, the vinyl copolymer of the invention is effective for imparting weatherability because a bulky substituent (siloxane) is positioned in the proximity of a crosslinking point in the unit of formula (1) to exert steric hindrance with which a crosslinking portion is protected and because the inventive vinyl copolymer can have a higher content of siloxane bond than the conventional ones. One preferred embodiment wherein the vinyl copolymer obtained by emulsion polymerization is combined with a crosslinking agent is effective for imparting flexibility because the bond distance of a crosslinking portion is longer by the length of the crosslinking agent and siloxane groups are localized from a structural aspect. As compared with conventional acrylic silicone copolymers, this embodiment is improved not only in weatherability and flexibility, but also in adhesion because the crosslinking agent also serves as a coupling agent between the cured coating and a substrate.

Accordingly, the present invention provides a vinyl copolymer comprising a silanol group-containing (meth)acryl siloxane unit of formula (1).

In another aspect, the present invention provides a method for preparing a vinyl copolymer comprising a silanol group-containing (meth)acryl siloxane unit of formula (1), comprising the step of copolymerizing a polymerizable vinyl monomer with a silanol group-containing (meth)acryl siloxane of formula (2) in the presence of a radical initiator or emulsion polymerizing a polymerizable vinyl monomer with a silanol group-containing (meth)acryl siloxane of formula (2) in an aqueous medium in the presence of a surfactant and a polymerization initiator.

In a further aspect, the present invention provides a room temperature curable resin composition comprising the above-defined vinyl copolymer and a condensation catalyst.

DETAILED DESCRIPTION OF THE INVENTION

The present invention provides a vinyl copolymer having a silanol group in a side chain. More particularly, the vinyl copolymer is prepared by copolymerizing a polymerizable vinyl monomer with a silanol group-containing (meth)acryl siloxane of formula (2). Then the vinyl copolymer has a backbone consisting essentially of units derived from a polymerizable vinyl monomer and a side chain suspending therefrom, the side chain being a suspending portion of a unit of formula (1). Units of formula (1) are random or block copolymerized with units of vinyl monomer. The vinyl polymer is thus represented as follows.

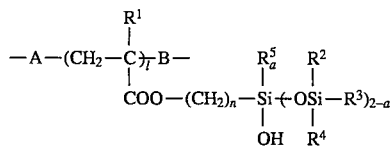

In the formula, A and B are polymerized units of vinyl monomer, and l is a positive number. A and B are identical or different, and polymerized units of one vinyl monomer or two or more vinyl monomers respectively.

One reactant is a polymerizable vinyl monomer which is not critical as long as it can form a thermoplastic polymer or rubbery elastomer. Examples of the monomer include (meth)acrylates such as methyl (meth)acrylate, ethyl (meth)acrylate, butyl(meth)acrylate, and 2-ethylhexyl (meth)acrylate; styrenes such as styrene, o-methylstyrene, p-methylstyrene, and α-methylstyrene; olefins such as ethylene and propylene; vinyl chloride and vinylidene chloride; fatty acid vinyls such as vinyl acetate; alkyl vinyl ethers such as methyl vinyl ether and ethyl vinyl ether; alkyl vinyl ketones such as methyl vinyl ketone and ethyl vinyl ketone; difficultly hydrolyzable silicon-containing polymerizable monomers such as vinyltrimethylsilane, 3-(meth)acryloxypropyltrimethylsilane, p-trimethylsilylstyrene, vinyltrimethoxysilane, 3-(meth)acryloxypropyltrimethoxysilane, p-trimethoxysilylstyrene, vinyl tris(trimethylsiloxy)silane, 3-(meth)acryloxypropyltris(trimethylsiloxy)silane, and p-tris(trimethylsiloxy)silylstyrene; and fluorinated polymerizable monomers such as 3,3,3-trifluoropropyl (meth)acrylate and 3,3,3-trifluoro-2-trifluoromethylethyl (meth)acrylate, alone or in admixture of two or more. Preferred monomers are methyl (meth)acrylate, ethyl (meth)acrylate, butyl (meth)acrylate, 2-ethylhexyl (meth)acrylate, styrene, and vinyl acetate.

Where a polymerizable vinyl monomer is used as a comonomer, it is generally known that the use of a polymerizable vinyl monomer having a polar group in combination with the polymerizable vinyl monomer is effective for improving the adherence of a coating when the resultant vinyl copolymer is applied as a coating resin. Examples of the polymerizable vinyl monomer having a polar group include unsaturated organic acids and anhydrides thereof such as (meth)acrylic acid, maleic acid, itaconic acid, citraconic acid, maleic anhydride, and itaconic anhydride; hydroxyl-containing compounds such as 2-hydroxyethyl (meth)acrylate and 2-hydroxypropyl (meth)acrylate; epoxy-containing compounds such as glycidyl (meth)acrylate and 2-(3,4-epoxycyclohexyl)ethyl (meth)acrylate; amino-containing compounds such as 2-(diethylamino)ethyl (meth)acrylate and 2-aminoethyl vinyl ether, N-vinyl-2-pyrrolidone, (meth)acrylamide, and acrylonitrile, alone or in admixture of two or more. The amount of a compound having a polar group should preferably be limited to 0 to 20%, especially 0 to 10% by weight of the entire polymerizable vinyl monomers because it tends to take in moisture (water) from air to exacerbate storage stability.

The other reactant is a silanol group-containing (meth)acryl siloxane of the following general formula (2). A silanol group-containing (meth)acryl siloxane unit derived from this siloxane is of the following general formula (1).

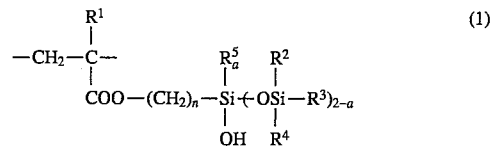

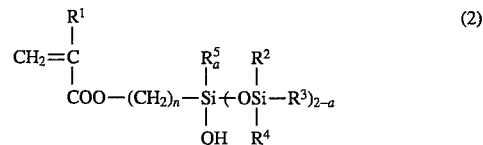

In formulae (1) and (2), $R^1$ is a hydrogen atom or methyl group, $R^2$, $R^3$, and $R^4$ are independently selected from the group consisting of a substituted or unsubstituted monovalent hydrocarbon group having 1 to 8 carbon atoms and a siloxy group of the formula: $-OSiR^6R^7R^8$ wherein $R^6$, $R^7$, and $R^8$ are independently selected from organic groups having 1 to 8 carbon atoms, $R^5$ is a substituted or unsubstituted monovalent hydrocarbon group having 1 to 8 carbon atoms, letter n is an integer of 1 to 12, and a is equal to 0 or 1.

Examples of the substituted or unsubstituted hydrocarbon group having 1 to 8 carbon atoms represented by $R^2$ to $R^5$ as well as $R^6$ to $R^8$ include alkyl groups such as methyl, ethyl, propyl and butyl; cycloalkyl groups such as cyclopentyl and cyclohexyl; aryl groups such as phenyl; aralkyl groups such as benzyl; alkenyl groups such as vinyl and allyl; and substituted groups such as chloromethyl, 3,3,3-trifluoropropyl and 2-cyanoethyl groups. Examples of the siloxy group of $-OSiR^6R^7R^8$ include trimethylsiloxy, ethyldimethylsiloxy, phenyldimethylsiloxy, vinyldimethylsiloxy, chloromethyldimethylsiloxy, 3,3,3-trifluoropropyldimethylsiloxy, and 2-cyanoethyldimethylsiloxy groups. $R^2$ to $R^8$ may be either identical or different although it is most preferred from the standpoints of availability of reactants, ease of synthesis and properties of a copolymer that all of $R^2$ to $R^8$ are methyl.

The silanol group-containing (meth)acryl siloxane of formula (2) can be prepared by effecting dehydrohalogenation reaction between organohalosilanes and silanols followed by hydrolysis reaction as disclosed in Japanese Patent Application No. 226438/1993. For achieving the objects of the invention, those siloxanes of formula (2) wherein n=3 and a=0 are preferred.

The vinyl copolymer of the invention contains units of formula (1), preferably in an amount of 1 to 50%, especially 5 to 20% by weight from the standpoints of hardness and flexibility.

Also preferably the vinyl copolymer has a weight average molecular weight of about 5,000 to 1,000,000.

According to the present invention, the vinyl copolymer is prepared by copolymerizing a polymerizable vinyl monomer with a silanol-containing (meth)acryl siloxane of formula (2) in the presence of a radical initiator (Method I) or by emulsion polymerizing a polymerizable vinyl monomer with a silanol-containing (meth)acryl siloxane of formula (2) in an aqueous medium in the presence of a surfactant and a polymerization initiator (Method II).

In Method I, any of conventional radical initiators may be used. Exemplary radical initiators include azobis compounds such as 2,2'-azobis(isobutyronitrile), 2,2'-azobis(2-methylbutyronitrile), and 2,2'-azobis(2,4-dimethylvaleronitrile); and organic peroxides such as venzoyl peroxide, lauroyl peroxide, tert-butylperoxybenzoate, and tert-butylperoxy- 2-ethylhexanoate, alone or in admixture of two or more.

Preferably the radical initiator is used in an amount of about 0.1 to 5 parts by weight per 100 parts by weight of the total of the polymerizable vinyl monomer and silanol-containing (meth)acryl siloxane.

More particularly, copolymerization is carried out by solution polymerization or bulk polymerization. Solution polymerization is to heat a solution of a polymerizable vinyl monomer and a silanol-containing (meth)acryl siloxane in a solvent in the presence of a radical initiator at about 50° to 150° C. for about 3 to 20 hours for reaction. Since bulk polymerization is a solventless polymerization process, the resulting copolymers are often unacceptable with respect to viscosity and residual monomer. Then the solution polymerization process using a solvent is recommended.

Examples of the solvent used in the solution polymerization include aliphatic hydrocarbons such as hexane, octane, decane, and cyclohexane; aromatic hydrocarbons such as benzene, toluene, and xylene; ethers such as diethyl ether, dibutyl ether, tetrahydrofuran, and dioxane; ketones such as acetone, methyl ethyl ketone, methyl isobutyl ketone, diisobutyl ketone, and cyclohexane; and esters such as methyl acetate, ethyl acetate, butyl acetate, and isobutyl acetate. It is preferred to use toluene and/or xylene among others.

In synthesizing the vinyl copolymer according to the invention, a chain transfer agent may be further added. Exemplary are mercapto compounds such as 2-mercaptoethanol, butylmercaptan, n-dodecylmercaptan, and 3-mercaptopropyltrimethoxysilane; and halides such as methylene chloride, chloroform, carbon tetrachloride, butyl bromide, and 3-chloropropyltrimethoxysilane. It is preferably used in an amount of about 0.01 to 10 parts by weight per 100 parts by weight of the total of the polymerizable vinyl monomer and siloxane of formula (2).

Method II uses a surfactant which serves as an emulsifying agent for emulsifying and dispersing a polymerizable vinyl monomer and a silanol-containing (meth)acryl siloxane of formula (2) in an aqueous medium. Typical surfactants are anionic surfactants including alkali metal salts of sulfonic acid such as sodium dodecylbenzenesulfonate, sodium lauryl-naphthalenesulfonate, and sodium stearyldiphenyl ether disulfonate; and alkali metal salts of sulfates such as sodium laurylsulfate, sodium polyoxyethylene lauryl ether sulfate, and sodium polyoxyethylene octyl phenyl ether sulfate though not limited thereto. The surfactant used may be an anionic surfactant alone although the use of an anionic surfactant in combination with a nonionic surfactant is effective for further improving the stability of an aqueous emulsion during polymerization and storage. Examples of such nonionic surfactant include polyoxyethylene nonyl phenyl ether, polyoxyethylene octyl phenyl ether, polyoxyethylene distearate, and polyoxyethylene cetyl ether. The nonionic surfactant should preferably have a HLB value of at least 10 because some surfactants with a HLB value of less than 10 would not allow for smooth progress of emulsion polymerization. Preferred is a mixture of an anionic surfactant and a nonionic surfactant in a weight ratio of from 1/9 to 4/6.

Preferably the surfactant is used in an amount of about 0.1 to 10 parts by weight per 100 parts by weight of the total of the polymerizable vinyl monomer and siloxane of formula (2).

Any of conventional polymerization initiators may be used as long as it undergoes cleavage to generate a radical. Exemplary are azobis compounds such as 2,2'-azobis-(isobutyronitrile), 2,2'-azobis(2-methylbutyronitrile), 2,2'-azobis(2,4-dimethylvaleronitrile), and 2,2'-azobis(2-amidinopropane) dihydrochloride; organic peroxides such as benzoyl peroxide, lauroyl peroxide, tert-butylperoxybenzoate, tert-butylperoxy-2-ethylhexanoate, tert-butylhydroperoxide, succinic peroxide, and maleic mono-tert-butyl peroxide; persulfates such as ammonium persulfate and potassium persulfate; redox systems such as aqueous hydrogen peroxide/ferric chloride and aqueous hydrogen peroxide/L-ascorbic acids. In general, emulsion polymerization uses water-soluble polymerization initiators while the present invention favors the same. Since the peroxides generate oxygen radicals which tend to withdraw hydrogen atoms to form undesirable crosslinkages during polymerization and thus require careful handling, the azobis compounds are preferred. Most preferred is 2,2'-azobis(2-amidinopropane) dihydrochloride.

Preferably the polymerization initiator is used in an amount of about 0.1 to 10 parts by weight per 100 parts by weight of the total of the polymerizable vinyl monomer and siloxane of formula (2).

In Method II of the invention, the silanol-containing vinyl copolymer is synthesized by emulsion polymerization of the above-mentioned reactants in an aqueous medium. The medium is water alone, typically deionized water while any water-soluble organic solvent may be additionally used if desired for reactant solubility and emulsion stability. Organic solvents which can be used along with water include methanol, ethanol, isopropanol, acetone, methyl ethyl ketone, acetonitrile, and tetrahydrofuran. However, the water-soluble organic solvent should preferably be used in a minimal amount and limited to at most 50%, especially at most 20% by weight of the aqueous medium.

In synthesizing the vinyl copolymer according to Method II, a chain transfer agent may be further added for adjustment of a degree of polymerization. Exemplary are mercapto compounds such as 2-mercaptoethanol, butylmercaptan, and n-dodecylmercaptan; and halides such as methylene chloride, chloroform, carbon tetrachloride, and butyl bromide. It is preferably used in an amount of about 0.01 to 10 parts by weight per 100 parts by weight of the total of the polymerizable vinyl monomer and siloxane of formula (2).

Emulsion polymerization may be carried out by any of well-known methods, for example, by dispersing predetermined amounts of a polymerizable vinyl monomer, silanol group-containing (meth)acryl siloxane, surfactant, polymerization initiator and optional chain transfer agent in an aqueous medium in a reactor, and heating the reactor. Alternatively, emulsion polymerization is carried out by dissolving a surfactant in an aqueous medium heating the solution, and adding dropwise the remaining components to the solution. Usually reaction is carried out at a temperature of 50° to 150° C. for about 3 to 20 hours. Polymerization can take place at room temperature to 50° C. when a redox polymerization initiator is used. Each of the components may be a single compound or a mixture of two or more compounds. The respective components can be dispersed in an aqueous medium by means of a homo-mixer or homogenizer or by ultrasonic agitation, thereby achieving a micelle size. This results in resin particles having a reduced particle size at the end of polymerization.

According to the present invention, there is obtained a silanol group-containing vinyl copolymer having a varying molecular weight (Mw), molecular weight dispersity (Mw/Mn), and glass transition temperature (Tg) complying with a particular application. For example, the molecular weight and molecular weight dispersity can be controlled by suitably selecting the type and amount of a radical initiator, solvent and chain transfer agent. Any desired glass transition temperature can be obtained by changing the type of polymerizable vinyl monomer(s).

In this regard, note that a copolymer obtained by radical polymerization and a copolymer obtained by emulsion polymerization are represented by the same general formula although the emulsion polymerized copolymer generally has a higher molecular weight. In general, the radical polymerized copolymer having a relatively low molecular weight does not require a crosslinking agent while the emulsion polymerized copolymer requires a crosslinking agent.

Also contemplated herein is a room temperature curable resin composition comprising the above-defined vinyl copolymer and a condensation catalyst.

Examples of the condensation catalyst include organic tin compounds such as dibutyltin dilaurate and dibutyltin diacetate; organic titanium compounds such as tetraisopropoxytitanium and tetrabutoxytitanium; amines such as 1,4-diazabicyclo(2.2.2)octane, 1,8-diazabicyclo(5.4.0)undecene-7,3-(2-aminoethyl)aminopropyltrimethoxysilane, and 3-aminopropyltriethoxysilane; inorganic acids such as hydrochloric acid and sulfuric acid; organic acids such as p-toluenesulfonic acid and phthalic acid; and alkali metal hydroxides such as sodium hydroxide and potassium hydroxide, with the organic tin compounds being especially preferred. The condensation catalysts may be used alone or in admixture of two or more.

When the copolymer emulsion resulting from emulsion polymerization is used as a curable resin composition without further treatment, the condensation catalyst should be microcapsulated because the emulsion can be destroyed by addition of the catalyst or the catalyst can be deactivated in water. Any of well-known methods may be used for microcapsulation. For example a condensation catalyst, liquid paraffin and water are thoroughly agitated by a homomixer or homogenizer, thereby forming an emulsion containing microcapsules, which will cleave upon drying. Microcapsules may be used alone or in admixture of two or more.

Preferably about 0.01 to 1 part by weight of the condensation catalyst is blended with 100 parts by weight of the silanol group-containing vinyl copolymer.

An aqueous emulsion composition comprising an aqueous emulsion of the silanol group-containing vinyl copolymer resulting from emulsion polymerization and a condensation catalyst for the silanol group is improved in storage stability and upon drying, forms a siloxane crosslinked, cured film. The silanol group-containing vinyl copolymer includes a backbone consisting essentially of a vinyl copolymer, for example, an acrylic backbone, to which is attached a side chain containing a silanol group of a specific structure as defined above. With the aid of the condensation catalyst, silanol groups condense with each other at room temperature to crosslink, forming a copolymer of a three dimensional structure. The reaction mechanism is shown below.

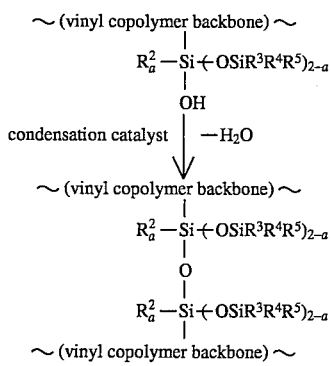

$R^2$ to $R^5$ and a are as previously defined.

Regardless of whether the condensation catalyst is present or absent, this cross linking reaction does not proceed in an emulsion system, that is, a system in which the silanol group-containing vinyl copolymer is dispersed in water as independent emulsion particles in the presence of a surfactant. The composition is thus found to be stable during storage. The probable reason is that the surfactant stably covers emulsion particles to prevent the condensation catalyst to act on the silanol groups. If the emulsion is destroyed, crosslinking reaction proceeds simultaneously. This suggests that gelation can occur during storage if the emulsion loses storage stability.

For use as a coating composition, the emulsion composition of the silanol group-containing vinyl copolymer is applied and dried whereupon the aqueous medium volatilizes to destroy the emulsion, allowing the condensation catalyst to act on silanol groups and crosslinking reaction to take place. Room temperature drying insures sufficient curing although curing can be promoted by heating.

Advantageously an aqueous emulsion of the silanol group-containing vinyl copolymer resulting from the emulsion polymerization method is used as the composition of the invention without any treatment.

In one preferred embodiment, a crosslinking agent is blended in the room temperature curable resin composition. Any of known crosslinking agents may be used as long as it has two or more hydrolyzable groups in a molecule. Preferably alkoxy, acyloxy, oxime and amine compounds of Si, Ti, Al, and Zr, and hydrolysates thereof are used. Examples include silanes such as tetramethoxysilane, tetraethoxysilane, methyltriacetoxysilane, methyltri(ethylmethylketoxime)silane, vinyltri(ethylmethylketoxime)silane, and methyltri(n-butylamino)silane and partially hydrolyzed oligomers thereof. Inter alia, tetramethoxysilane and partially hydrolyzed oligomers thereof are preferred. When the crosslinking agent is blended in an emulsion system, careful attention should be paid to the stability of emulsion particles, that is, a choice should be made of the agent which does not destroy the emulsion.

Preferably about 1 to 10 parts by weight of the crosslinking agent is blended with 100 parts by weight of the silanol group-containing vinyl copolymer.

In the composition of this embodiment, silanol groups are bonded through the crosslinking agent with the aid of moisture (water) in air at room temperature to form a three dimensional structure according to the following reaction scheme.

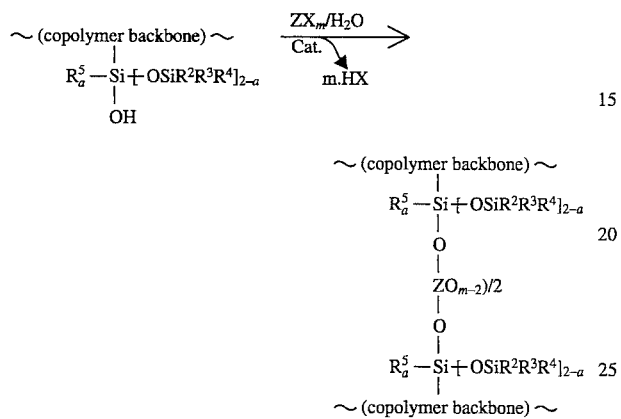

$ZX_m$ is a crosslinking agent, X is a hydrolyzable group, m is 2 or more, Cat. is a condensation catalyst, and the remaining symbols are as previously defined.

Additionally the room temperature curable resin composition may have inorganic or organic fillers, pigments and other additives blended therein insofar as the advantages of the invention are not impaired. The room temperature curable resin composition may be used as a blend with any of conventional resins because the composition is well compatible with conventional resins.

The room temperature curable resin composition of the invention may be of one pack type wherein all the components are blended together or of two pack type wherein the condensation catalyst is a separate pack. As opposed to prior art acrylic silicone resin compositions, especially of one pack type, which suffer from the problems of thickening and gelation because crosslinking gradually proceeds during storage, the room temperature curable resin composition of the preferred embodiment wherein the crosslinking agent serves as a moisture scavenger has improved storage stability even when it is of one pack type, indicating that the composition is advantageously applied as weather resistant paint and coating.

The vinyl copolymer having a silanol group in a side chain is useful as a major component in formulating a room temperature curable resin composition which cures into a coating having weatherability, flexibility and adherence. Even in one pack form, the room temperature curable resin composition is improved in storage stability and cures into a coating having weatherability, flexibility and adherence. The composition is thus useful as paint for coating purposes. The methods of the invention insure simple preparation of such vinyl copolymers.

EXAMPLE

Examples of the invention are given below together with Comparative Examples by way of illustration and not by way of limitation. All parts are by weight.

EXAMPLE 1

A flask equipped with a dropping funnel, condenser, thermometer and stirrer was purged with nitrogen, charged with 100 parts of toluene, and heated to 80° C. Separately a solution was prepared by mixing and dissolving 85 parts of methyl methacrylate, 7 parts of butyl acrylate, 8 parts of silicone methacrylate (I) shown in Table 1, and 1 part of 2,2'-azobis(isobutyronitrile). The solution was added dropwise to the toluene through the dropping funnel in a nitrogen stream at 80° to 90° C. over 2 hours.

The reaction solution was ripened at 80° C. for 5 hours before a sample was taken therefrom for determining a reactivity, which was calculated to be 99.5% from a weight loss on drying. The reaction solution was cooled down to room temperature, obtaining a vinyl copolymer as a colorless clear liquid. Analysis was made on the copolymer. It had a weight average molecular weight of 40,000 as measured by GPC. A peak of Si—OH was observed in IR spectroscopy, indicating the presence of a silanol group.

EXAMPLE 2–3 & COMPARATIVE EXAMPLES 1–2

Vinyl copolymers were prepared as in Example 1 using a polymerizable vinyl monomer, silicone methacrylate, radical initiator, and solvent and a temperature as reported in Table 1. The weight average molecular weight was measured by GPC and the presence of a silanol group was confirmed by IR spectroscopy.

The results are shown in Table 1. Note that with respect to the silanol group, "+" indicates its presence and "−" indicates its absence.

TABLE 1

|  | Example | | | Comparative Example | |
| --- | --- | --- | --- | --- | --- |
|  | 1 | 2 | 3 | 1 | 2 |
| Polymerizable vinyl monomer (pbw) | | | | | |
| Methyl methacrylate | 85 | 85 | 85 | 85 | 85 |
| Butyl acrylate | 7 | 7 | 7 | 7 | 7 |
| 2-ethylhexyl methacrylate | — | — | — | — | 8 |
| Silicone methacrylate* (pbw) | | | | | |
| (I) | 8 | 8 | — | — | — |
| (II) | — | — | 8 | — | — |
| (III) | — | — | — | 8 | — |
| Radical initiator (pbw) | | | | | |
| 2,2'-azobis(iso-butyronitrile) | 1 | — | 1 | 1 | 1 |
| 2,2'-azobis(2-methylbutyronitrile) | — | 1 | — | — | — |
| Solvent (pbw) | | | | | |
| toluene | 100 | — | 100 | 100 | 100 |
| xylene | — | 100 | — | — | — |
| Temperature, °C. | 80 | 100 | 80 | 80 | 80 |
| Mw (by GPC) | 40,000 | 30,000 | 50,000 | 40,000 | 40,000 |
| Silanol group (by IR) | + | + | + | − | − |

*Silicone methacrylates are shown below.

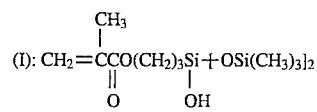

TABLE 1-continued

|  | Example | | | Comparative Example | |
|---|---|---|---|---|---|
|  | 1 | 2 | 3 | 1 | 2 |

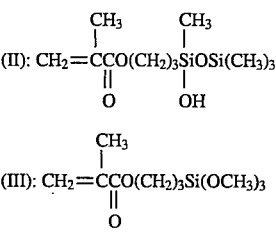

(II): $CH_2=\underset{\underset{O}{\|}}{C}CO(CH_2)_3\underset{OH}{\underset{|}{Si}}OSi(CH_3)_3$ with CH₃ groups (III): $CH_2=\underset{\underset{O}{\|}}{C}CO(CH_2)_3Si(OCH_3)_3$ with CH₃

EXAMPLES 4–7 & COMPARATIVE EXAMPLES 3–6

A room temperature curable resin composition was prepared by mixing 100 parts of a vinyl copolymer, 5 parts of a crosslinking agent, and 0.2 part of a condensation catalyst and diluting with toluene to give a non-volatile content of 25% by weight. Using a bar coater (#36), the composition was applied to a cold rolled steel strip so as to provide a film thickness of about 10 μm after drying and allowed to stand at room temperature for 7 days for curing to take place.

The cured coating was evaluated for hardness, adherence, flexibility, solvent resistance, and weatherability by the following methods. Also the room temperature curable resin composition was evaluated for storage stability.

Hardness

Pencil hardness was measured using a Mitsubishi Uni pencil.

Adherence

A crosshatched adhesive tape test was carried out by scribing the cured coating to define 10×10 sections of 1 mm square, applying adhesive tape (Celophan Tape by Nichiban K.K.) thereto, and stripping the tape. Adherence was evaluated in terms of the number of unstripped sections.

Flexibility

A 6-mm diameter mandrel test was carried out to evaluate a sample according to the following criterion.

○: no change in outer appearance
Δ: microscopic cracks
×: cracked and peeled

Solvent resistance

Xylene rubbing was carried out 10 cycles to evaluate a sample according to the following criterion.

○: no change in outer appearance
Δ: a little change in outer appearance
×: a change in outer appearance Weatherability Using a sunshine weatherometer (manufactured by Suga Tester K.K.), the outer appearance of a sample after 300 hour exposure was evaluated according to the following criterion.

○: no change in outer appearance
Δ: a little change in outer appearance
×: a change in outer appearance Storage stability A room temperature curable resin composition was placed in a container and stored at 40° C. in a sealed condition to determine the time (days) taken until gelation.

TABLE 2

|  | Vinyl copolymer | Crosslinking agent* | Condensation catalyst* | Hardness | Adherence | Flexibility | Solvent resistance | Weatherability | Sotrage stability |
|---|---|---|---|---|---|---|---|---|---|
| Example | | | | | | | | | |
| 4 | Example 1 | A | D | 2H | 100 | ○ | ○ | ○ | >30 days |
| 5 | Example 1 | B | D | H | 100 | ○ | ○ | ○ | >30 days |
| 6 | Example 1 | C | D | H | 100 | ○ | ○ | ○ | >30 days |
| 7 | Example 3 | A | E | H | 90 | ○ | ○ | ○ | >30 days |
| Comparative Example | | | | | | | | | |
| 3 | Example 1 | — | D | The coating cracked and was unmeasurable. | | | | | |
| 4 | Example 1 | A | — | F | 20 | Δ | Δ | X | >30 days |
| 5 | Comparative Example 1 | — | D | H | 80 | X | ○ | Δ | 10 days |
| 6 | Comparative Example 2 | A | D | The coating cracked and was unmeasurable. | | | | | |

*A: tetramethoxysilane
B: methyltri(ethylmethylketoxime)silane
C: tetramethoxysilane partially hydrolyzed oligomer
D: dibutyltin diluarate
E: dibutyltin diacetate

EXAMPLE 8

In a reactor equipped with a condenser, thermometer and stirrer, 1 part of sodium dodecylbenzenesulfonate and 2 parts of polyoxyethylene nonyl phenyl ether (HLB=15.5) were dissolved in 100 parts of deionized water. A premix of 85 parts of methyl methacrylate, 7 parts of butyl acrylate, and 8 parts of silicone (meth)acrylate I was added to the reactor. Agitation at room temperature resulted in a suspension. To the suspension was added an aqueous solution of 0.5 part of 2,2'-azobis(2-amidinopropane) dihydrochloride in 50 parts of deionized water. With stirring, the reaction solution was heated to 60° C. over 30 minutes and ripened at 60° to 70° for 5 hours. At this point, a sample was taken out for determining a reactivity, which was calculated to be 98.7% from a non-volatile content as determined from a weight loss on heating.

The resulting aqueous emulsion was a milky white colloidal liquid. Filtration through a 200-mesh net left a residue which was less than 1% by weight of the resinous value. The copolymer resin isolated form the emulsion was determined for weight average molecular weight by GPC and for the presence of a silanol group by IR spectroscopy. The average particle size of resin particles was also measured.

The results are shown in Table 3.

EXAMPLES 9–12

Emulsion polymerization was carried out by the same procedure as in Example 8 except that the components were changed as shown in Table 3. A milky white colloidal liquid was obtained in every run. The copolymer resins isolated form the emulsions were determined for weight average molecular weight, the presence of a silanol group, and average particle size as in Example 8.

The results are also shown in Table 3.

COMPARATIVE EXAMPLE 7

Emulsion polymerization was carried out by the same procedure as in Example 8 except that the components were changed as shown in Table 3 to include silicone (meth)acrylate (III) having an alkoxysilyl group. The reaction solution gradually thickened during ripening and gelled after 4 hours of ripening.

COMPARATIVE EXAMPLE 8

Emulsion polymerization was carried out by the same procedure as in Example 8 except that the surfactant was omitted. Resin particles precipitated out after 2 hours of ripening.

COMPARATIVE EXAMPLE 9

Emulsion polymerization was carried out by the same procedure as in Example 8 except that the silicone (meth)acrylate was omitted. There was obtained a milky white colloidal liquid. No silanol was confirmed.

The results are shown in Table 3. Note that with respect to the silanol group, "+" indicates its presence and "−" indicates its absence.

TABLE 3

|  | Example | | | | | Comparative Example | | |
|---|---|---|---|---|---|---|---|---|
|  | 8 | 9 | 10 | 11 | 12 | 7 | 8 | 9 |
| Polymerizable vinyl monomer (pbw) | | | | | | | | |
| Methyl methacrylate | 85 | 85 | 85 | 85 | 85 | 85 | 85 | 85 |
| Butyl acrylate | 7 | 7 |  | 7 | 7 | 7 | 7 | 15 |
| Styrene |  |  | 7 |  |  |  |  |  |
| Silicone (meth)acrylate 1) (pbw) | | | | | | | | |
| I | 8 |  | 8 | 8 |  |  | 8 |  |
| II |  | 8 |  |  |  |  |  |  |
| III |  |  |  |  |  | 8 |  |  |
| IV |  |  |  |  | 8 |  |  |  |
| Surfactant 2) (pbw) | | | | | | | | |
| A | 1 | 1 | 1 | 1 | 1 | 1 |  | 1 |
| N | 2 | 2 | 2 | 2 | 2 | 2 |  | 2 |
| Polymerization initiator 3) (pbw) | 0.5 | 0.5 | 0.5 | 1 | 0.5 | 0.5 | 0.5 | 0.5 |
| Chain transfer agent 4) (pbw) |  |  |  | 0.5 |  |  |  |  |
| Deionized water (pbw) | 150 | 150 | 150 | 120 | 150 | 150 | 150 | 150 |
| Water-soluble organic solvent 5) (pbw) |  |  |  | 30 |  |  |  |  |
| Mw (by GPC) | 800,000 | 900,000 | 700,000 | 200,000 | 800,000 | gelled unmeasured | precipitated unmeasured | 900,000 |
| Silanol group (by IR) | + | + | + | + | + | unmeasured | unmeasured | − |
| Mean particle size, μm | 0.09 | 0.11 | 0.10 | 0.13 | 0.11 | unmeasured | unmeasured | 0.10 |

The components in Table 3 are shown below.

1) Silicone methacrylate

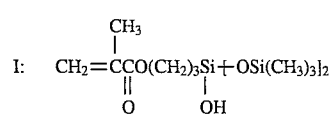

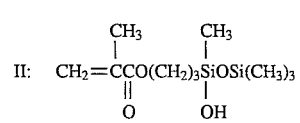

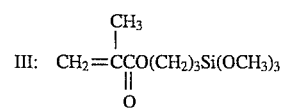

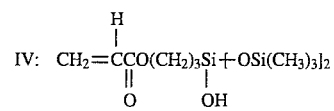

-continued

2) Surfactant
   A: sodium dodecylbenzenesulfonate
      (anionic surfactant)
   N: polyoxyethylene nonyl phenyl ether
      (nonionic surfactant, HLB = 15.5)

3) Polymerization initiator
   2,2'-azobis(2-amidinopropane)
   dihydrochloride

4) Chain transfer agent
   n-dodecylmercaptan

5) Water-soluble organic solvent
   acetone

EXAMPLES 13–15 & COMPARATIVE EXAMPLES 10–14

Compositions (emulsions) were prepared by uniformly mixing 100 parts of a vinyl copolymer (in the form of an emulsion having a solids content of 40% by weight), 1 part of a condensation catalyst, and 10 parts of a crosslinking agent as shown in Table 4. Each composition, about 2 grams, was cast into an aluminum dish having a diameter of 60 mm and a depth of 5 mm and allowed to stand at room temperature for 3 days for curing. The film had a thickness of about 0.3 mm after drying.

The cured film was determined for crosslinking by carrying out Soxhlet extraction with toluene for 24 hours to determine a gel fraction. The emulsion composition was evaluated for storage stability by placing the emulsion composition in a container in a sealed manner, storing at 40° C., and determining the time taken until separation occurred between the vinyl copolymer and the aqueous medium. The results are shown in Table 4.

Although some preferred embodiments have been described, many modifications and variations may be made thereto in the light of the above teachings. It is therefore to be understood that within the scope of the appended claims, the invention may be practiced otherwise than as specifically described.

We claim:

1. A room temperature curable resin composition comprising a vinyl copolymer comprising a silanol group-containing (meth)acryl siloxane unit of the following formula (1):

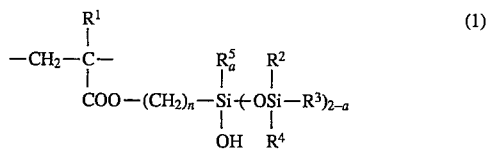

wherein $R^1$ is a hydrogen atom or methyl group; $R^2$, $R^3$, and $R^4$ are independently selected from the group consisting of a monovalent hydrocarbon group having 1 to 8 carbon atoms and a siloxy group of the formula: $-OSiR^6R^7R^8$, where $R^6$, $R^7$, and $R^8$ are independently selected from organic groups having 1 to 8 carbon atoms; $R^5$ is a substituted or unsubstituted monovalent hydrocarbon group having 1 to 8 carbon atoms; letter n is an integer of 1 to 12, and a is equal to 0 or 1, and a condensation catalyst.

2. The room temperature curable resin composition according to claim 1, wherein the hydrocarbon group having 1 to 8 carbon atoms represented by $R^2$–$R^5$ is selected from the group consisting of alkyl, cycloalkyl, aryl and alkenyl.

3. The room temperature curable composition according to claim 2, wherein the hydrocarbon group is selected from the group consisting of methyl, ethyl, propyl, butyl, cyclopentyl, cyclohexyl, phenyl, benzyl, vinyl and allyl.

TABLE 4

|  | Vinyl copolymer | Condensation catalyst | Crosslinking agent | Gel fraction (%) | Storage stability |
|---|---|---|---|---|---|
| Example 13 | Example 8 | A | — | 93.5 | >30 days |
| Example 14 | Example 8 | A | E | 98.7 | >30 days |
| Example 15 | Example 12 | A | — | 94.3 | >30 days |
| Comparative Example 10 | Example 8 | — | E | 3.3 | >30 days |
| Comparative Example 11 | Example 8 | B | — | 82.6 | 3 hours |
| Comparative Example 12 | Example 8 | C | — | separated immediately after addition of C | |
| Comparative Example 13 | Example 8 | D | — | separated immediately after addition of D | |
| Comparative Example 14 | Comparative Example 9 | A | E | 1.8 | >30 days |

The condensation catalyst and crosslinking agent used are shown below.

A: microcapsulated dioctyltin dilaurate/water emulsion (active ingredient 30%)

B: 30% dioctyltin dilaurate/acetone solution

C: 2N aqueous hydrochloric acid

D: 2N sodium hydroxide solution

E: organosilica sol (Snowtex O manufactured by Nissan Chemical K.K.)

Japanese Patent Application Nos. 5-301221 and 6-53670 are incorporated herein by reference.

4. The room temperature curable composition according to claim 1, wherein the hydrocarbon group having 1 to 8 carbon atoms represented by $R^2$–$R^5$ is a substituted group selected from the group consisting of chloromethyl, 3,3,3-trifluoropropyl and 2-cyanoethyl.

5. The room temperature curable composition according to claim 1, wherein the siloxy group represented by $R^2$–$R^4$ is selected from the group consisting of trimethylsiloxy, ethyldimethylsiloxy, phenyldimethylsiloxy, vinyldimethylsiloxy, chloromethyldimethylsiloxy, 3,3,3-trifluoropropyldimethylsiloxy, and 2-cyanoethyldimethylsiloxy.

6. The room temperature curable resin composition according to claim 1, wherein $R^2$–$R^8$ each represent a methyl group.

7. The room temperature curable resin composition according to claim 1, wherein the vinyl copolymer has a weight average molecular weight of about 5,000 to 1,000,000.

8. The room temperature curable resin composition according to claim 1, wherein the condensation catalyst is selected from the group consisting of an organic tin compound, an amine, an inorganic acid, an organic acid and an alkali metal hydroxide.

9. The room temperature curable resin composition according to claim 1, wherein the condensation catalyst is selected from the group consisting of dibutyltin dilaurate, dibutyltin diacetate, tetraisopropoxytitanium, tetrabutoxytitanium, 1,4-diazabicyclo (2.2.2)octane, 1,8-diazabicyclo(5.4.0)undecene-7,3-( 2-aminoethyl)aminopropyltrimethoxysilane, 3-aminopropyltriethoxysilane, hydrochloric acid, sulfuric acid, p-toluenesulfonic acid, phthalic acid, sodium hydroxide and potassium hydroxide.

10. The room temperature curable resin composition according to claim 1, wherein the condensation catalyst is an organic tin compound.

11. The composition of claim 1 wherein said condensation catalyst is microcapsulated.

12. The room temperature curable resin composition according to claim 11, wherein the condensation catalyst is microencapsulated in liquid paraffin.

13. The room temperature curable resin composition according to claim 1, wherein 0.01 to 1 part by weight of the condensation catalyst is blended with 100 parts by weight of the vinyl copolymer.

14. The composition of claim 1 further comprising a crosslinking agent.

15. The room temperature curable resin composition according to claim 14, wherein the crosslinking agent is an alkoxy, acyloxy, oxime, or amine compound of Si, Ti, Al, or Zr, or hydrolysates thereof.

16. The room temperature curable resin composition according to claim 14, wherein the crosslinking agent is selected from the group consisting of tetramethoxysilane, tetraethoxysilane, methyltriacetoxysilane, methyltri(ethylmethylketoxime)silane, vinyltri(ethylmethylketoxime)silane and methyltri(n-butylamino)silane, and partially hydrolyzed oligomers thereof.

17. The room temperature curable resin composition according to claim 14, wherein the crosslinking agent is tetramethoxysilane or partially hydrolyzed oligomers thereof.

18. The room temperature curable resin composition according to claim 14, wherein 1 to 10 parts by weight of the crosslinking agent is blended with 100 parts by weight of the vinyl copolymer.

* * * * *